_United States Patent Office_

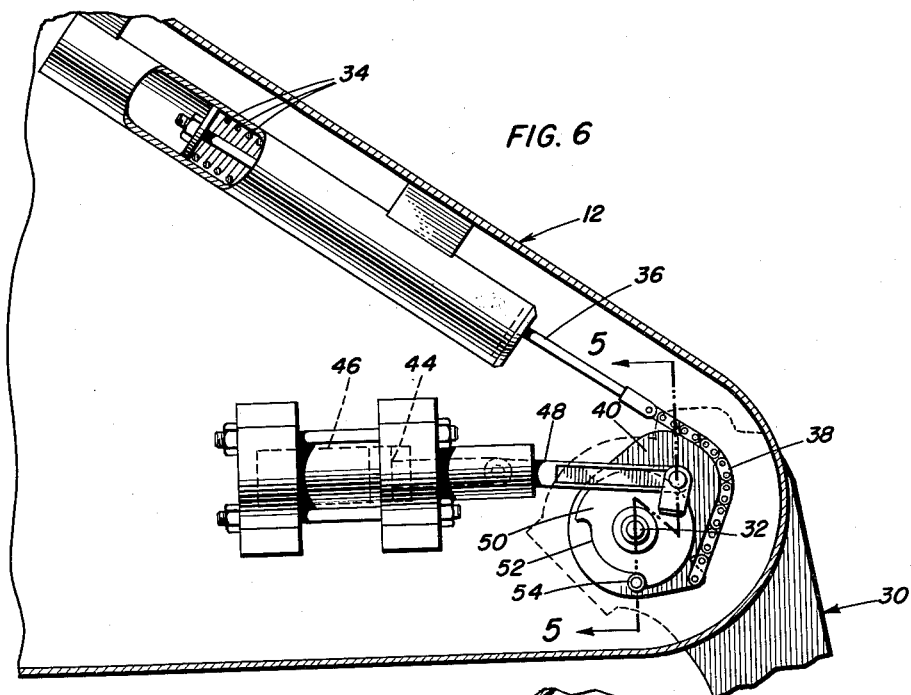
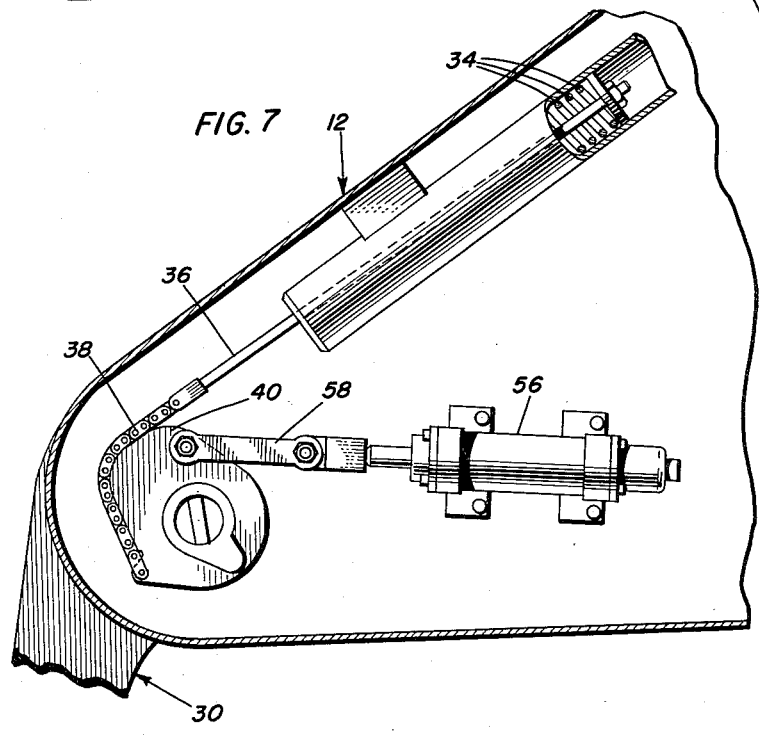

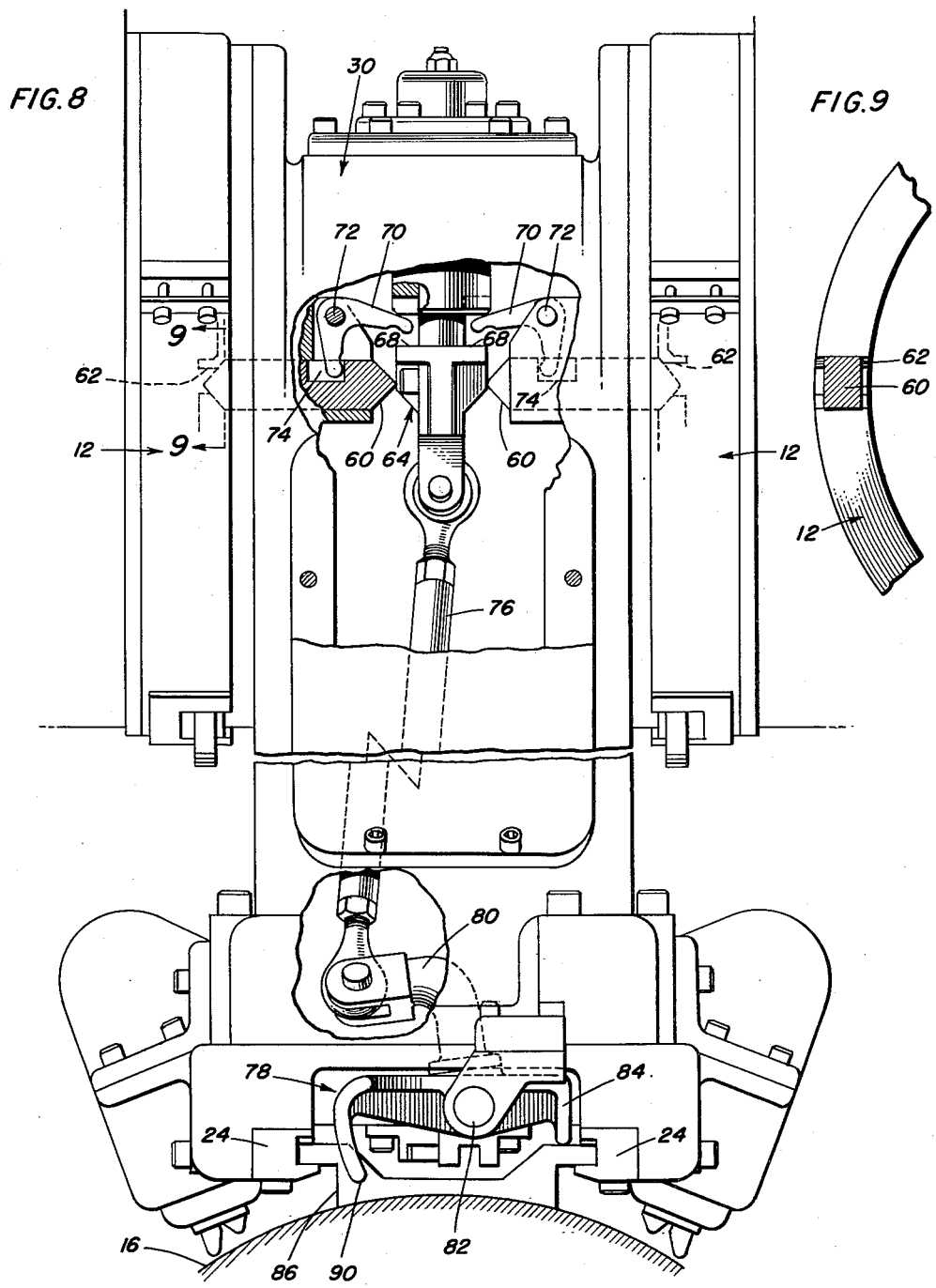

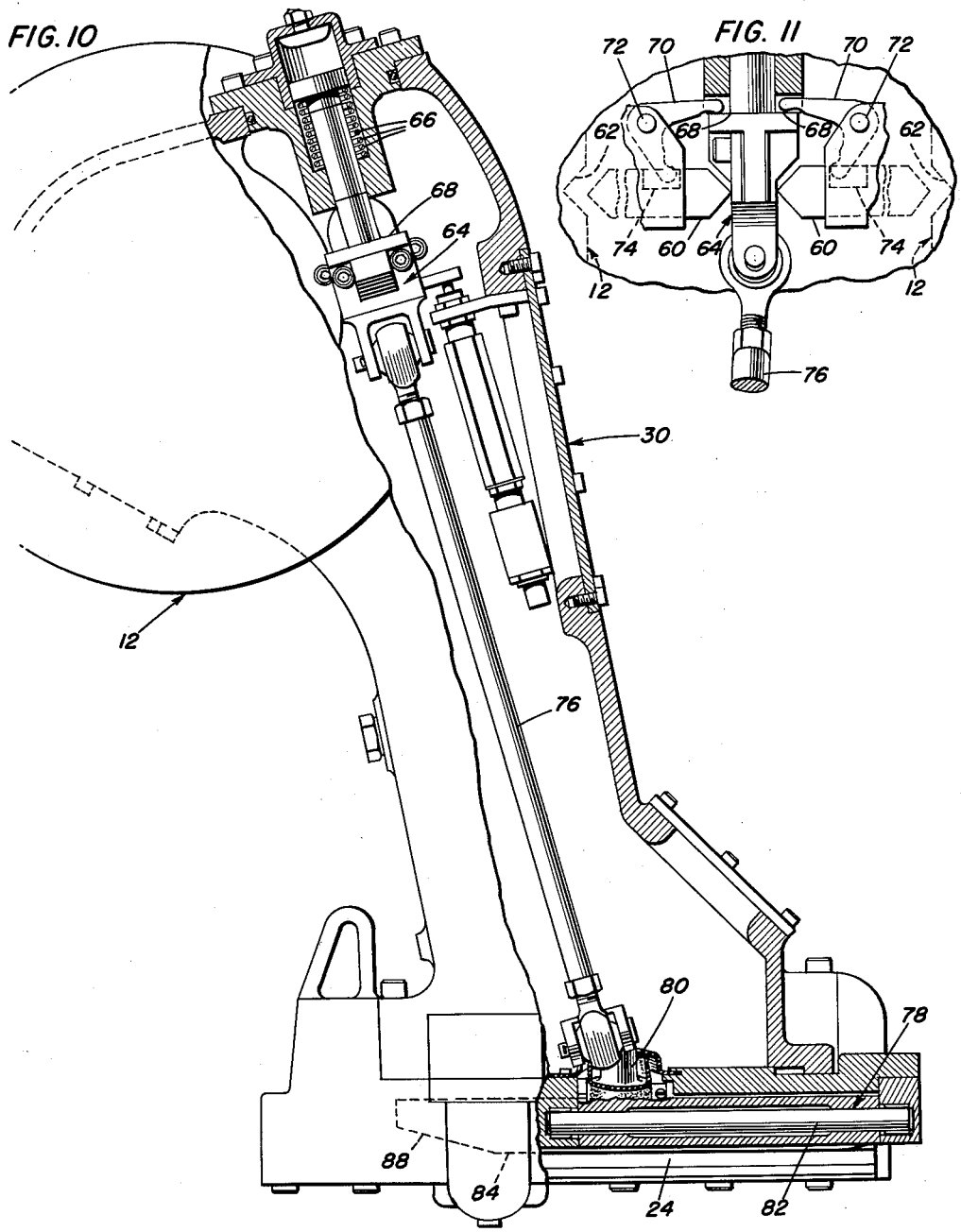

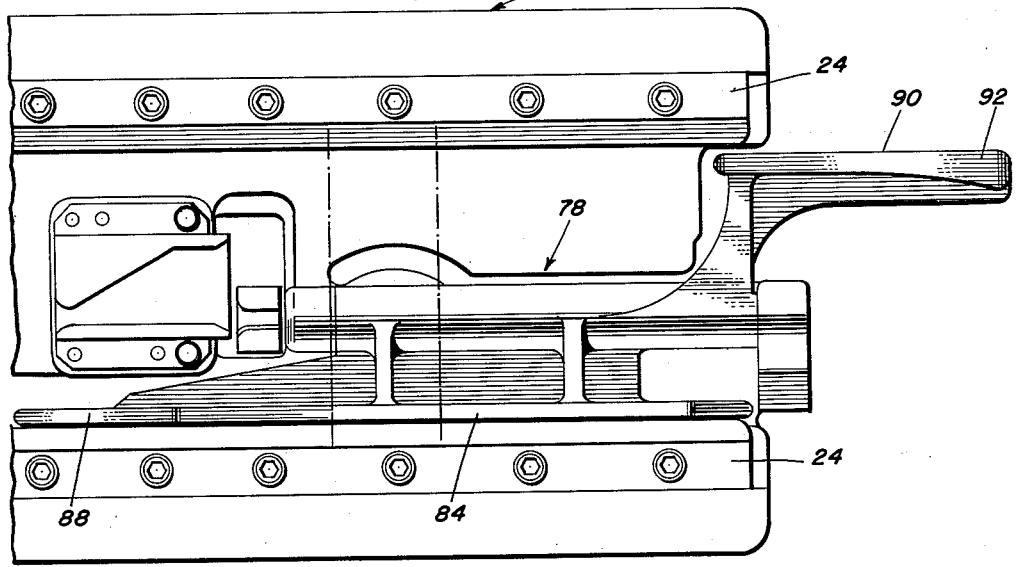
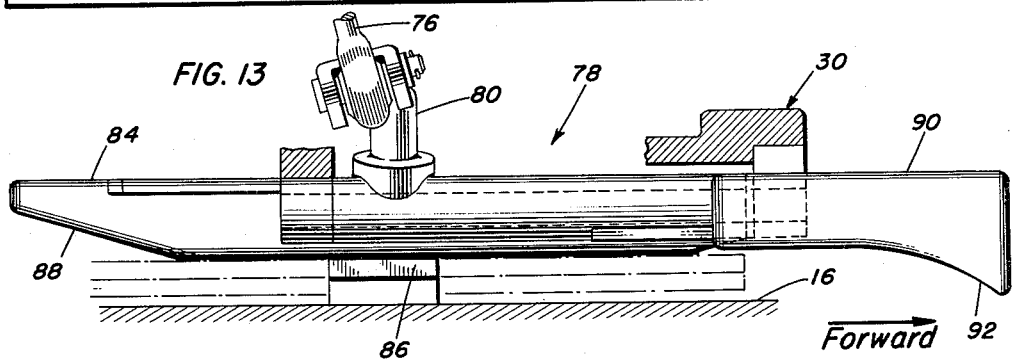
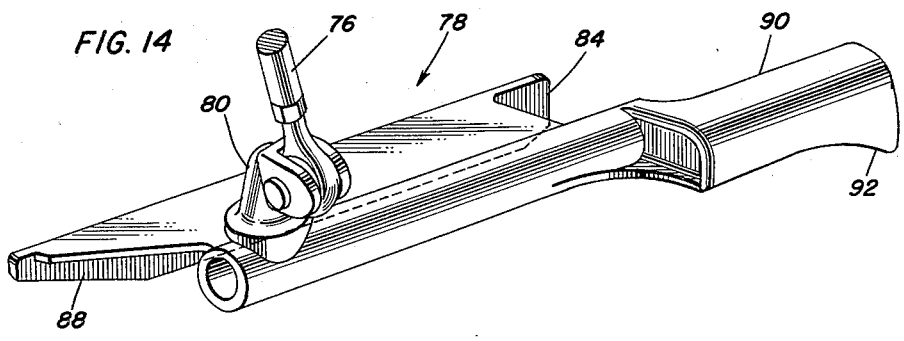

3,045,552
Patented July 24, 1962

3,045,552
MISSILE LAUNCHER FRONT GUIDE AND
LATCHING MECHANISM THEREFOR
Arvid Grenstad, Ralph F. Hereth, and Lawrence R. Morris, Port Orchard, and George M. Sherman, Bremerton, Wash., assignors to the United States of America as represented by the Secretary of the Navy
Filed Aug. 11, 1960, Ser. No. 49,107
11 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to missile launchers and more particularly to a missile launcher front guide and a latching mechanism therefor.

In the field of missile launchers, it has been the general practice to employ a continuous rail mounted on the missile launcher arm, which rail will receive both the forward and rearward lugs of the missile. In prior devices, the forward lug of a missile travels a relatively short distance on the rail whereas the rearward lug travels a much greater distance. When the forward lug leaves the rail in such prior devices, the forward part of the missile has a tendency to drop. In other words, the missile tends to pivot about the rearward shoe causing the rearward shoe to bind on the rail. The missile would also be thrown out of alignment with the target necessitating a greater amount of recovery in flight. Although such devices have served the purpose, they have not proved entirely satisfactory under all conditions of operation because of the aforementioned difficulties which have been encountered.

The present invention contemplates the provision of a missile launcher arm constructed in such a manner that the aforementioned difficulties will not be encountered. To attain this desired result, the launcher arm of the present invention is provided with a fixed rearward rail portion, a movable center rail portion and a forward rail portion rigidly attached to a movable front guide. The center rail portion is pivotally connected to the arm at a pivot point adjacent the rearward rail portion and is connected to a hydraulic piston adjacent the forward rail portion whereby the center rail portion can be moved into alignment with the rearward and forward rail portions for ramming of the missile onto the launcher arm and out of alignment therewith after the missile has been rammed and prior to launch. Because of the different configurations of the front and rear lugs of the missile, during launch the forward rail portion must be moved out of alignment with the rearward rail portion after the front lug of the missile has left the forward rail portion so that the rearward lug will not strike the latter. To achieve this, the front guide upon which the forward rail portion is mounted is pivotally mounted on the launcher arm and is movable out of alignment with the rearward rail portion when the front lug of the missile has moved off the forward rail portion.

It is, therefore, an object of the present invention to provide a missile launcher wherein the front and rear shoes or lugs of the missile travel approximately the same distance in contact with the launcher arm rail.

Another object is to provide a missile launcher so constructed that both shoes of the missile leave the launcher at approximately the same time.

A further object of the invention is the provision of a launcher arm wherein a forward rail portion is moved out of alignment with a rearward rail portion when the front lug of the missile leaves the forward rail to prevent the rear lug from striking the forward rail portion.

Still another object is to provide a launcher wherein the forward rail portion is moved into alignment with the rearward rail portion prior to ramming the missile on the launcher arm and is maintained in such alignment while the front lug is on the forward rail portion.

Still another object of the invention is to provide a launcher wherein the forward rail portion is locked in alignment with the rearward rail portion until the front lug of the missile leaves the forward rail portion and then is moved out of alignment with the rearward rail portion prior to the arrival of the rear lug at the location of the forward rail portion.

Other object and many of the attendant advantages of this invention will be readily appreciated as the same becomes better understood by reference to the following detailed description when considered in connection with the accompanying drawings wherein:

FIG. 6 is an enlarged side elevation view of the forward right hand portion of the launcher arm with portions broken away and parts removed for clarity;

FIG. 7 is an enlarged side elevation view of the forward left hand portion of the launcher arm with portions broken away and parts removed for clarity;

FIG. 8 is a front elevation view of the launcher arm with parts broken away to better illustrate the details thereof;

FIG. 9 is a fragmentary section view of the launcher arm taken substantially along line 9—9 in FIG. 8;

FIG. 10 is an enlarged side elevation view of the front guide with parts broken away to better illustrate the details thereof;

FIG. 11 is a fragmentary detail view partly in elevation and partly in sections illustrating the position of the latching means when the front guide is in the up position;

FIG. 12 is a bottom plan view of the front guide;

FIG. 13 is a side elevation view with portions broken away and parts removed for clarity showing the actuating mechanism for the latching means; and FIG. 14 is a perspective view of the mechanism shown in FIG. 13.

Figure 1:
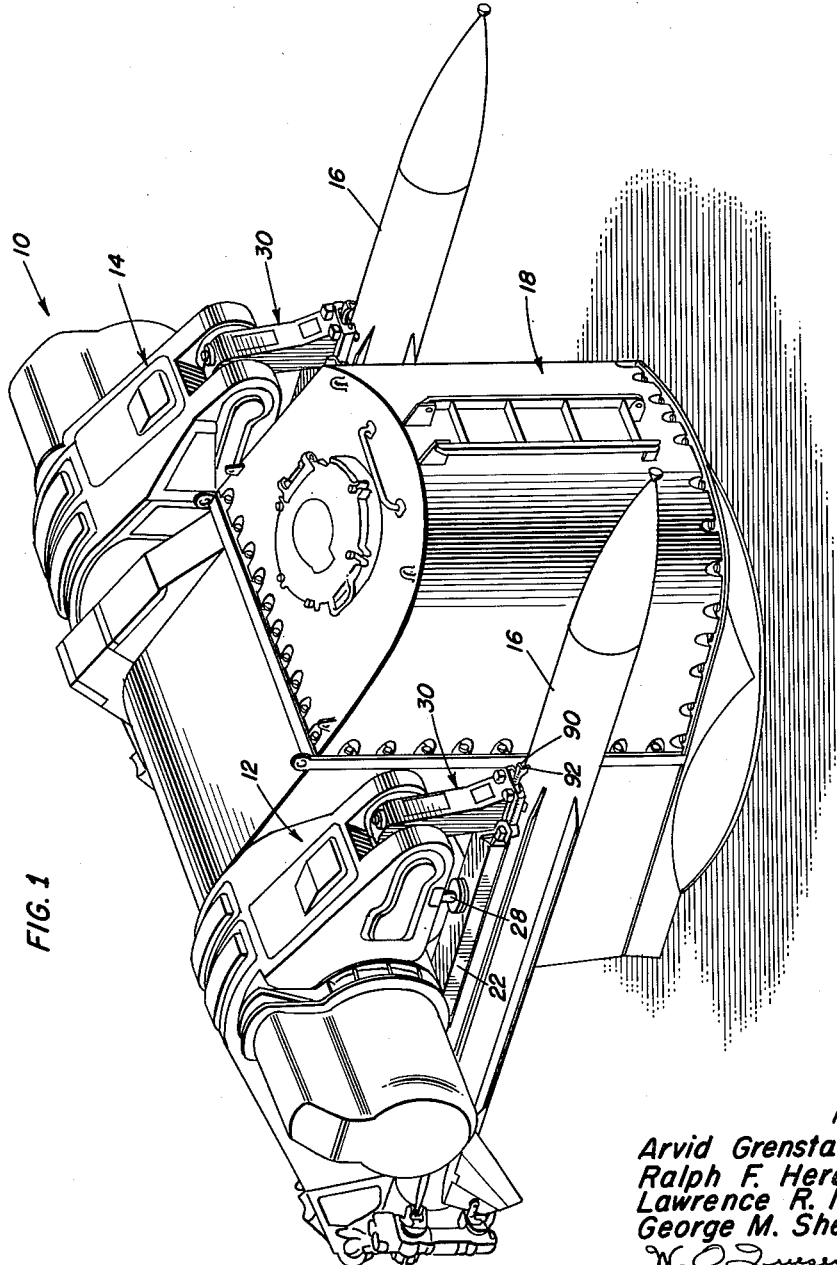
FIG. 1 is a perspective view of the launcher having a missile in position for launching on each launcher arm.

Referring to FIG. 1 of the drawings, the trainable missile launcher 10 comprises a pair of launcher arms 12 and 14 movable in elevation to align missiles 16 thereon with the target. It will be understood that the base portion 18 of the missile launcher is movable 360° in train to align the missiles 16 carried by the launcher arms 12 and 14 with the target in this plane of movement. The launcher arms 12 and 14 are substantially identical except they are assembled in opposite hand relationship. For the purpose of simplicity of description, only one of these arms will be described, it being understood that the other arm is identical except as aforementioned.

Figure 2:
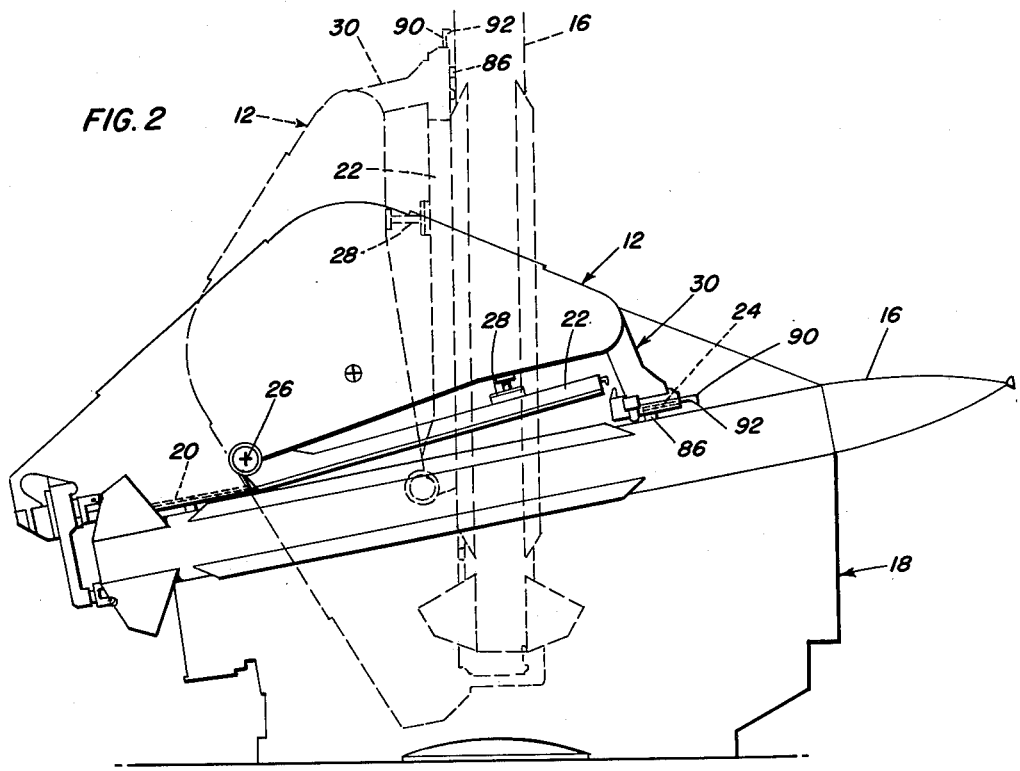
FIG. 2 is a side elevation view of the launcher shown in FIG. 1 and illustrates the loading position by broken lines.
Figure 3:
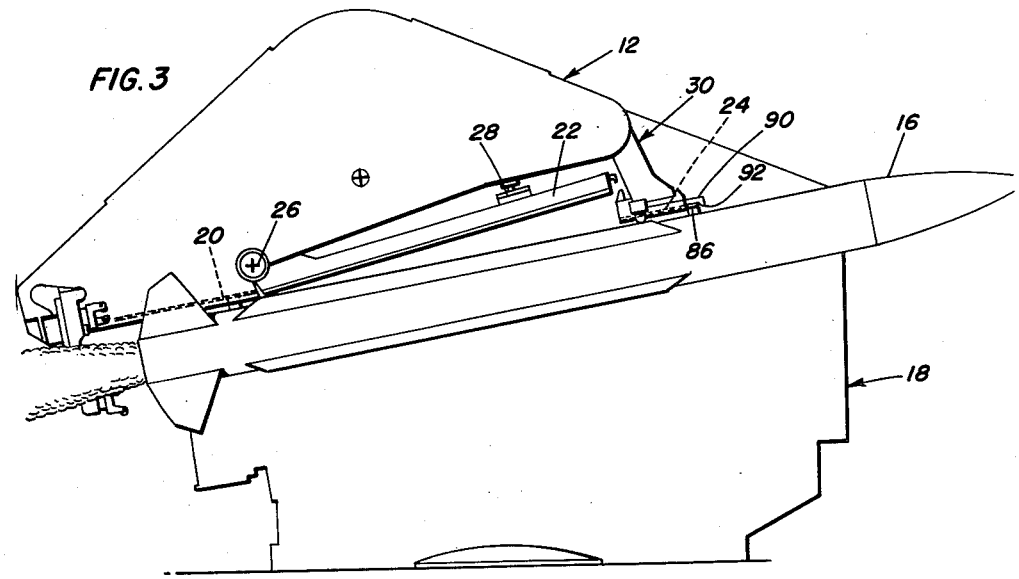
FIG. 3 is a side elevation view of the launcher shown in FIG. 1 and illustrates the missile during launch as its front lug leaves the launcher arm.
Figure 4:
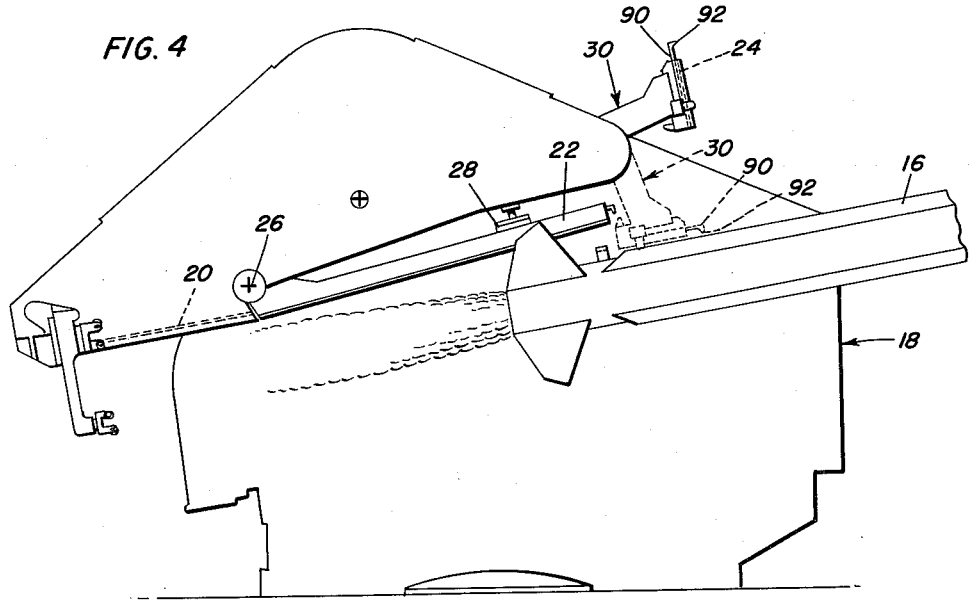
FIG. 4 is a side elevation view of the launcher shown in FIG. 1 and depicts the missile during launch with the front lug having left the launcher before the rear lug has reached the front guide which is shown in the up position by full lines and the down position by broken lines.

The launcher arm 12 has mounted on the lower portion thereof a rearward rail portion 20, a center rail portion 22 and a forward rail portion 24, as illustrated in FIGS. 2, 3 and 4. The rearward rail portion 20 is rigidly fixed to the lower portion of the launcher arm 12. The center rail portion 22 is pivotally mounted on the launcher arm 12 by pivot pin 26, and is carried by a hydraulic piston and cylinder 28 at the forward portion thereof.

As the piston is extended in the cylinder, the center rail portion 22 is caused to pivot about pivot pin 26 to align the center rail portion 22 with the rearward and forward rail portions 20 and 24, respectively, when the missile 16 is to be rammed onto the launcher arm 12 immediately after which the missile will be in the dotted line position shown in FIG. 2. Once the missile 16 has been rammed onto the launcher arm 12, the center rail portion 22 serves no further purpose and is moved to the upper position by the retraction of the piston in the cylinder 28 where it is out of alignment with the rearward and forward rail portions 20 and 24, respectively, and does not interfere with the launching of the missile 16.

Figure 5:
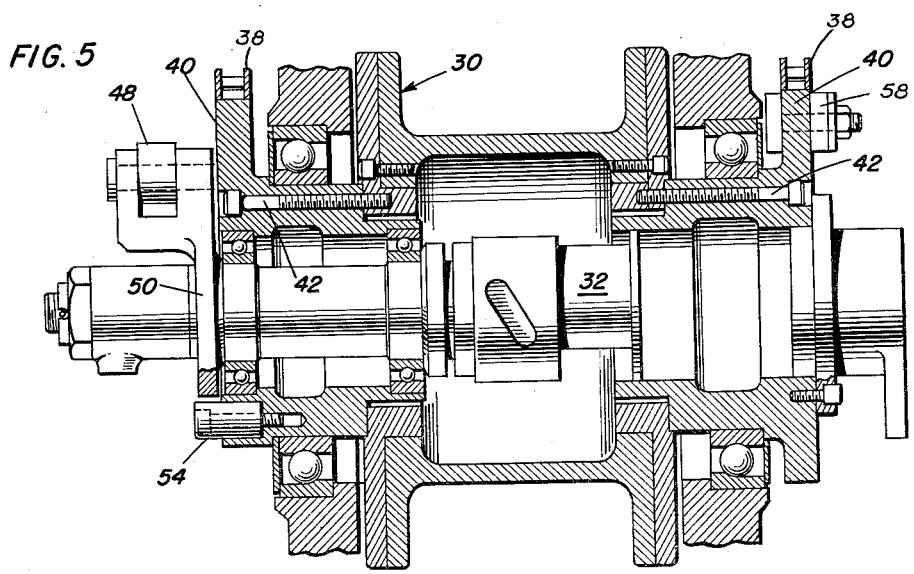
FIG. 5 is a section taken substantially along line 5—5 in FIG. 6.

The forward rail portion 24 is carried by a front guide 30 which is rotatively mounted on a shaft 32 which is, in turn, rotatively mounted on the launcher arm 12, as shown in FIG. 5. The front guide 30 is biased to the position shown in full lines in FIG. 4, which is herein referred to as the "up" position by a pair of compression springs 34 which are mounted on each side of the launcher arm 12 (see FIGS. 6 and 7). The springs 34 are connected to the front guide 30 by connecting rods 36 and flexible link chains 38. The chains 38 are fastened to the connecting rods 36 at one end and to a pair of torque arms 40 at the other end. The torque arms 40 are connected to the front guide 30 by any suitable means such as bolts 42.

The piston 44, FIG. 6, of the front guide hydraulic cylinder 46 is attached through a link 48 to a swivel head 50 which is fixed to the shaft 32 adjacent to one of the torque arms 40. The swivel head 50 has a cut-out portion 52 in the periphery thereof. A drive pin 54 is fixed to one of the torque arms 40 and extends outwardly therefrom into the cut-out portion 52 of swivel head 50. The cut-out portion 52 extends around the periphery of swivel head 50 a slightly greater distance than the distance the drive pin 54 travels when the torque arm 40 rotates with the front guide 30. As the piston 44 is extended, the swivel head 50 is rotated and the forward end of the cut-out portion 52 engages the drive pin 54 moving the drive pin 54 along with the swivel head 50. The torque arm 40 and hence the front guide 30 is rotated about the shaft 32 to the operative or down position.

As the torque arms 40 rotate, the compression springs 34 are compressed thereby putting a bias force on the torque arms 40 tending to rotate them back to the inoperative or up position. The configuration of the cut-out portion 52 is such that the piston 44 may be retracted and the swivel head 50 rotated to the original position without contact with the drive pin 54 thereby allowing the piston 44 to be moved out of the way of the front guide 30 while the front guide is still in the operative position. This action is necessary since the front guide 30 will be retracted in a shorter period of time by the springs 34 than by removal of the hydraulic force on the piston 44. To provide braking action on the front guide 30 as it is moved to the up position by the springs 34, a front guide buffer 56, FIG. 7, is connected through linkage 58 to the torque arm 40 on the opposite side of the launcher arm 12 from the torque arm carrying the drive pin 54.

Since the spring force applied to the front guide 30 is high, on the order of 1400 lbs., means for holding or locking the front guide in the down position is required. This means comprises a pair of latches 60 slidably mounted in the housing of the front guide 30 for movement transversely of the longitudinal axis of the front guide to engage in suitable detents or cut-outs 62 in the mounting structure of the launcher arm 12 (see FIGS. 8 through 11). The latches 60 are moved outwardly of the front guide 30 into the detents 62 in the launcher arm 12 by a cam member 64 biased to the up position by a coil spring 66. As the cam member 64 is moved to the up position by the spring 66, the top portion 68 thereof strikes one arm of bell cranks 70 mounted for pivotal movement by pins 72 on the front guide 30. The other arm of bell cranks 70 extends into slots 74 cut into the latches 60. The pivotal movement of the bell cranks 70, due to the upward movement of the cam member 64, withdraws the latches 60 from the detents 62 allowing the front guide 30 to be moved to the up position by the compression springs 34.

The cam member 64 is moved downwardly against the action of the spring 66 by a push rod 76 which is connected to a member 78 through an eccentrically mounted linkage 80. The member 78 is pivotally mounted on a shaft 82 in the lower end of the front guide 30 in a position such that arm 84 of the member will be engaged by the front lug 86 of a missile 16 as the missile is rammed onto the forward rail portion 24 (see FIGS. 8, 13 and 14). A cam section 88 on arm 84 cams the arm upwardly causing the member 78 to pivot about the shaft 82 in a counterclockwise direction, as seen in FIG. 8.

A safety device 90, FIGS. 13 and 14, is integral with the member 78 and extends forwardly of the forward end of the forward rail portion 24. The safety device 90 comprises a cam portion 92 which extends into the path of travel of the front lug 86 on missile 16 when the front guide 30 is in the down position. The safety device 90 is mounted on member 78 on the opposite side of the pivot shaft 82 from the arm 84 such that when the missile lug 86 strikes the cam portion 92 of the safety device, the member 78 will be pivoted in a clockwise direction, as seen in FIG. 8.

The spring 66 which biases the cam member 64 to the upward position is sufficient in most instances to withdraw the latches 60 from the detents 62 allowing the retract springs 34 to move the front guide 30 to the up position. However, in the event that through friction or inertia the spring 66 cannot move the cam 64 to the up position to withdraw the latches 60, the cam portion 92 of the safety device 90 will be struck by the front lug 86 of the missile 16 after the front missile lug has left the forward rail portion 24 and will pivot the member 78 in the clockwise direction which will exert a force through the eccentric linkage 80 in the upward direction on the pushrod 76. The cam 64 will be moved to the upward position striking the bell cranks 70 and withdrawing the latches 60 allowing the retract springs 34 to move the front guide 30 to the up position. It will therefore be apparent that the front guide 30 will be moved to the up position even in the event of friction in or inertia of the latches 60 or the cam mechanism 64.

In operation, the launcher 10 is trained to the loading position as shown in broken lines in FIG. 2, and the arms 12 are elevated until aligned with the loading mechanism (not shown). At this time the hydraulic front guide piston 44 is extended thereby pivoting the front guide 30 about the shaft 32 until the forward rail portion 24 is aligned with the rearward rail portion 20. The hydraulic cylinder 28 mounting the forward end of the center rail portion 22 is extended aligning the center rail portion with the rearward rail portion 20 and the forward rail portion 24.

The missile 16 is rammed onto the launcher arm 12 until the front lug 86 of the missile is in position on the forward rail portion 24 and the rear lug is in position on the rearward rail portion 20. As the front lug 86 of the missile 16 is rammed onto the forward rail portion 24, it contacts the cam section 88 on the member 78 rotating the member counterclockwise, as seen in FIG. 8. As the member 78 rotates, the eccentric linkage 80 exerts a force downwardly on the push rod 76 pulling the cam member 64 down against the action of the coil spring 66. As the cam member 64 moves downwardly, it cams the latches 60 outwardly of the front guide housing into the detents 62 in the launcher arm mounting structure. The front guide piston 44 is then retracted, leaving the front guide 30 latched in position by the two latches 60 in contact with the detents 62 in the launcher arm 12.

The two latches 60 will be held in detents 62 in the launcher arm 12 as long as the front lug 86 of the missile 16 holds the member 78 in the counterclockwise pivot position. As the front lug 86 leaves the forward rail portion 24, the compression spring 66 pulls the cam member 64 upwardly. The top portion 68 of cam member 64 strikes the bell cranks 70 retracting the latches 60 into the front guide housing. The compression springs 34 retract the front guide 30 to the up position through the connecting rods 36, chains 38 and torque arms 40.

In the event that through friction or inertia the compression spring 66 does not raise the cam member 64 to the up position, the front lug 86 of the missile will strike the cam portion 92 which extends outwardly of the front end of the forward rail portion 24 and will pivot the member 78 in a clockwise direction, as seen in FIG. 8. As the member 78 is pivoted in a clockwise direction, the eccentric linkage 80 will exert a force upwardly on the push rod 76 moving the cam member 64 to the up position withdrawing the latches 60. As soon as the latches 60 move out of the detents 62, the retract springs 34 will pull the front guide 30 to the up position.

It is therefore readily apparent that as soon as the front lug 86 leaves the forward rail portion 24, the front guide 30 will be returned to the up position out of the line of travel which the rear lug of the missile traverses as the missile 16 is launched. The withdrawal of the front guide 30 prevents damage to the launcher and obviates the aforementioned difficulty encountered in prior launchers when the missile is launched off course as a result of sequential instead of simultaneous separation of the missile lugs from the launcher.

Obviously many modifications and variations of the present invention are possible in the light of the above teachings. It is therefore to be understood that within the scope of the appended claims the invention may be practiced otherwise than as specifically described.

What is claimed is:

1. In a missile launcher having a pair of launcher arms for receiving on each a missile to be launched, a front guide mounted for pivotal movement between two positions on the forward portion of each of said arms, a rail member mounted on said front guide for reception of the front lug on said missile, spring means for biasing said front guide in one of said two positions, means for moving said front guide to the other of said two positions against the action of said spring means, locking means for releasably securing said front guide in the other of said two positions while said front lug on said missile is in contact with said rail, means responsive to the movement of the front lug into contact with the forward rail for engaging said locking means, and means for releasing said locking means when said front lug moves out of contact with said rail.

2. In a missile launcher having a pair of launcher arms for receiving on each arm a missile to be launched, said missile having front and rear lugs thereon, a front guide mounted on each arm for pivotal movement between a first position wherein said front guide is removed from the path of travel of the rear lug on said missile as the missile is launched and a second position wherein the front guide is in position to receive the front lug of said missile as the same is rammed onto the arm, a rail member mounted on said front guide for reception of the front lug of said missile, spring means biasing said front guide to one of said two positions, hydraulic means for moving said front guide to the other of said two positions against the action of said spring means, locking means for releasably securing said front guide in the other of said two positions while said front lug is in contact with said rail, means responsive to the movement of the front lug into contact with the forward rail for engaging said locking means, and means for releasing said locking means when said front lug moves out of contact with said forward rail portion.

3. In a missile launcher having a pair of launcher arms for receiving on each a missile to be launched, said missile having front and rear lugs, a front guide mounted on each arm for pivotal movement between a first position wherein the front guide is removed from the path of travel of the rear lug of the missile as the same is launched and a second position wherein the guide is in position for reception of the front lug of the missile as the same is rammed onto the arm, a rail member mounted on said front guide for reception of the front lug of said missile, a pair of springs mounted on each of said arms and connected to said front guide to bias said front guide to said first position, a hydraulic piston and cylinder assembly mounted on each of said arms and connected to said front guide to move said front guide to said second position, locking means for releasably securing said front guide in said second position while said front lug is in contact with said forward rail portion, means responsive to the movement of the front lug into contact with the forward rail for engaging said locking means, and cam means for releasing said locking means when said front lug moves out of contact with said forward rail portion.

4. In a dual-arm missile launcher for launching missiles having front and rear lugs, a front guide mounted on each arm for pivotal movement between a first position wherein the guide is removed from the line of movement of the rear lug of the missile as the missile is launched and a second position wherein the front guide is in position to receive the front lug of the missile as the same is rammed onto the arm, a rail member mounted on said front guide for reception of the front lug on each missile, spring means biasing said front guide to one of said two positions, hydraulic means for moving said front guide to the other of said positions, a pair of locking devices movable into engagement with the arm for releasably securing said front guide in said second position while the front lug of said missile is in contact with said rail, means movable into engagement with said locking devices for holding said locking devices in engagement with said arm, and a cam mounted adjacent said rail for releasing said locking devices from engagement with the arm when said front lug of the missile moves out of contact with said rail.

5. In a dual-arm missile launcher for launching missiles having front and rear lugs, a front guide mounted for pivotal movement between two positions on the forward portion of each arm, a rail member mounted on said front guide for reception of the front lug of a missile, spring means biasing said front guide to one of said two positions, means mounted on each arm and connected to said front guide thereof for moving the latter to the other of said two positions, a pair of latches slidably mounted for transverse movement relative to the front guide into engagement with the launcher arm, means for camming said latches into engagement with said launcher arms when the front lug of the missile is moved into contact with said rail, and means for withdrawing said latches from engagement with the launcher arm when said front lug moves out of contact with said rail.

6. In a missile launcher for launching a missile having front and rear lugs of different configuration, at least one launcher arm mounted for rotary movement on said launcher, a rearward rail portion mounted at one end of said launcher arm for the reception of the rear lug of the missile, a front guide mounted for pivotal movement between two positions at the other end of said launcher arm, a forward rail portion mounted on said front guide, a center rail portion mounted on said launcher arm between said rearward rail portion and said front guide for pivotal movement between a first position wherein the center rail portion is in alignment with said rearward and forward rail portions and a second position wherein the center rail portion is out of alignment with said rearward and forward rail portions, means for moving said center rail portion to said two positions, spring means biasing said front guide to one of said two positions wherein the forward rail portion is out of alignment with the rearward rail portion, means for moving said front guide to the other of said two positions against the action of said spring means wherein the forward rail portion is in alignment with the rearward rail portion, locking means for releasably securing said front guide in the other of said two positions while the front lug is in contact with the forward rail portion, means responsive to the movement of the front lug into contact with the forward rail for engaging said locking means, and means for releasing said locking means when the front lug moves out of contact with the forward rail portion.

7. In a missile launcher for launching a missile having front and rear lugs of different configuration, at least one launcher arm mounted for rotary movement on said launcher, a rearward rail portion mounted at one end of said launcher arm for the reception of the rear lug of the missile, a front guide mounted for pivotal movement between two positions at the other end of said launcher arm, a forward rail portion mounted on said front guide, a center rail portion mounted on said launcher arm between said rearward rail portion and said front guide for pivotal movement between a first position wherein the center rail portion is in alignment with said rearward and forward rail portions and a second position wherein the center rail portion is out of alignment with said rearward and forward rail portions, means for moving said center rail portion to said two positions, spring means biasing said front guide to one of said two positions wherein said forward rail portion is out of alignment with the rearward rail portion, hydraulic means for moving said front guide to the other of said two positions wherein the forward rail portion is in alignment with the rearward rail portion and is in position for the reception of the front lug of the missile, locking means for releasably securing said front guide in the other of said two positions while the front lug is in contact with the forward rail portion, means movable into engagement with said locking means for maintaining said locking means in locked condition, and means for releasing said locking means when said front lug moves out of contact with said forward rail portion.

8. In a missile launcher for launching a missile having front and rear lugs of different configuration, at least one launcher arm mounted for rotary movement on said launcher, a rearward rail portion mounted at one end of said launcher arm for the reception of the rear lug of the missile, a front guide mounted for pivotal movement between two positions at the other end of said launcher arm, a forward rail portion mounted on said front guide, a center rail portion mounted on said launcher arm between said rearward rail portion and said front guide for pivotal movement between a first position wherein the center rail portion is in alignment with said rearward and forward rail portions and a second position wherein the center rail portion is out of alignment with said rearward and forward rail portions, means for moving said center rail portion to said two positions, a pair of springs mounted on said launcher arm and connected to said front guide for biasing said front guide to one of said two positions wherein the forward rail portion is out of alignment with the rearward rail portion, means for moving said front guide to the other of said two positions wherein the forward rail portion is in alignment with the rearward rail portion and is in position for the reception of the front lug of the missile, locking means for releasably securing said front guide in the other of said two positions while the front lug is in contact with said forward rail portion, cam means responsive to the movement of the front lug into contact with the forward rail for engaging said locking means, and means for releasing said locking means when said front lug moves out of contact with said forward rail portion.

9. In a missile launcher for launching a missile having front and rear lugs of different configuration, at least one launcher arm mounted for rotary movement on said launcher, a rearward rail portion mounted at one end of said launcher arm for the reception of the rear lug of the missile, a front guide mounted for pivotal movement between two positions at the other end of said launcher arm, a forward rail portion mounted on said front guide, a center rail portion mounted on said launcher arm between said rearward rail portion and said front guide for pivotal movement between a first position wherein the center rail portion is in alignment with said rearward and forward rail portions and a second position wherein the center rail portion is out of alignment with said rearward and forward rail portions, means for moving said center rail portion to said two positions, a pair of springs mounted on said launcher arm and connected to said front guide for biasing said front guide to one of said two positions wherein the forward rail portion is out of alignment with the rearward rail portion, a hydraulic piston and cylinder assembly mounted on said launcher arm and connected to said front guide for moving said front guide to the other of said two positions wherein the forward rail portion is in alignment with the rearward rail portion and is in position for the reception of the front lug of the missile, locking means for releasably securing said front guide in the other of said two positions while the front lug is in contact with said forward rail portion, means responsive to the movement of the front lug into contact with the forward rail for engaging said locking means, means for maintaining said locking means in locked condition, and means for releasing said locking means when said front lug moves out of contact with said forward rail portion.

10. In a missile launcher for launching a missile having front and rear lugs of different configuration, at least one launcher arm mounted for rotary movement on said launcher, a rearward rail portion mounted at one end of said launcher arm for the reception of the rear lug of the missile, a front guide mounted for pivotal movement between two positions at the other end of said launcher arm, a forward rail portion mounted on said front guide, a center rail portion mounted on said launcher arm between said rearward rail portion and said front guide for pivotal movement between a first position wherein the center rail portion is in alignment with said rearward and forward rail portions and a second position wherein the center rail portion is out of alignment with said rearward and forward rail portions, means for moving said center rail portion to said two positions, a pair of springs mounted on said launcher arm and connected to said front guide for biasing said front guide to one of said two positions wherein the forward rail portion is out of alignment with the rearward rail portion, means for moving said front guide to the other of said two positions wherein the forward rail portion is in alignment with the rearward rail portion and is in position for the reception of the front lug of the missile, a pair of locking devices movable into engagement with the launcher arm for releasably securing said front guide in the other of said two positions, means responsive to the movement of the front lug into contact with the forward rail portion for moving said locking devices into engagement with said launcher arm, and means responsive to the movement of the front lug out of contact with the forward rail portion for moving said locking devices out of engagement with said launcher arm.

11. The apparatus as set forth in claim 10, wherein the pair of locking devices comprise a pair of latches slidably mounted for transverse movement relative to the front guide, said locking devices moving means comprises a double faced cam and further comprises link means operatively attached to said locking devices for effecting movement of said locking devices out of engagement with said launcher arm.

References Cited in the file of this patent

UNITED STATES PATENTS

| | | |
|---|---|---|
| 2,489,984 | Shoemaker | Nov. 29, 1949 |
| 2,804,805 | Henig | Sept. 3, 1957 |
| 2,826,960 | Schiavi | Mar. 18, 1958 |